United States Patent
Panje

(10) Patent No.: US 12,316,492 B2
(45) Date of Patent: May 27, 2025

(54) ORCHESTRATING BACKHAUL AND FRONTHAUL TOPOLOGIES IN MIXED MODE MESH NETWORK

(71) Applicant: ARRIS Enterprises LLC, Suwanee, GA (US)

(72) Inventor: Krishna Prasad Panje, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 588 days.

(21) Appl. No.: 17/577,654

(22) Filed: Jan. 18, 2022

(65) Prior Publication Data

US 2022/0294694 A1  Sep. 15, 2022

Related U.S. Application Data

(60) Provisional application No. 63/158,443, filed on Mar. 9, 2021.

(51) Int. Cl.
*H04L 41/0816* (2022.01)
*H04W 72/0453* (2023.01)
*H04W 88/08* (2009.01)

(52) U.S. Cl.
CPC ..... *H04L 41/0816* (2013.01); *H04W 72/0453* (2013.01); *H04W 88/08* (2013.01)

(58) Field of Classification Search
CPC .......... H04L 41/0816; H04W 72/0453; H04W 88/08
See application file for complete search history.

(56) References Cited

U.S. PATENT DOCUMENTS

2012/0322481 A1* 12/2012 Laroche ................ H04W 48/16
    455/509
2018/0103505 A1*  4/2018 Amini ................. H04W 84/045
(Continued)

FOREIGN PATENT DOCUMENTS

EP    3 648 510    5/2020

OTHER PUBLICATIONS

International Preliminary Report on Patentability and Written Opinion issued Sep. 21, 2023 in International Application No. PCT/US2022/12733.

(Continued)

*Primary Examiner* — Alex Skripnikov
(74) *Attorney, Agent, or Firm* — Wenderoth, Lind & Ponack, L.L.P.

(57) ABSTRACT

A controller, located at a network resource or as part of an access point device, can configure an access point device to selectively configure the backhaul (BH) and fronthaul (FH) connections of a network based on one or more network parameters associated with the network devices within the network. The controller can associate a 6 GHz band or high frequency band to the BH connection with legacy network devices associated to a lower frequency band for a FH connection while other network devices are associated to a higher frequency band, such as a 5 GHz band, for a FH connection based on the one or more network parameters. The controller can dynamically switch the other network devices to a 6 GHz or higher frequency band after an update of the one or more network parameters indicate network performance, for example, will be improved by the switch.

20 Claims, 6 Drawing Sheets

(56) References Cited

U.S. PATENT DOCUMENTS

| | | |
|---|---|---|
| 2018/0279192 A1 | 9/2018 | Raissinia et al. |
| 2019/0082373 A1* | 3/2019 | Patil ..................... H04L 1/1614 |
| 2019/0342795 A1 | 11/2019 | McFarland et al. |
| 2022/0225152 A1* | 7/2022 | Schultz ................. H04W 72/51 |

OTHER PUBLICATIONS

International Search Report and the Written Opinion of the International Searching Authority dated Apr. 20, 2022 in International (PCT) Application No. PCT/US2022/012733.
Fabrizio Simon: "What does WiFi Band Steering mean?", Mar. 17, 2017 (Mar. 17, 2017), pp. 1-4, XP055852592, Retrieved from the Internet: URL:https://www.broadbandbuyer .com/features/3254-what-does-wifi-band-steering-mean/?_cf_chl_captcha_tk __=pmd_ gTyYMG62leqTA0. 9 65Ck9CVessNrpgczUyenoIXcRdY-1634635364- 0-gqNtZGzNA1CjcnBszQi9.

* cited by examiner

ORCHESTRATING BACKHAUL AND FRONTHAUL TOPOLOGIES IN MIXED MODE MESH NETWORK

BACKGROUND

Companies are increasingly providing Multiple Access Point (MAP) architecture or Home Network Controller (HNC) and/or mesh type of wireless fidelity (Wi-Fi) management, with multiple access point devices and/or extender access point devices within the network to improve Quality of Experience (QoE) of the user by offering extended coverage with seamless roaming. Access point devices and extender access point devices communicate with client devices using one or more RF channels allocated to a frequency band.

Many networks often experience a problem with connecting or associating new network devices with extended capabilities given the number of legacy network devices within the network. The legacy network devices can prevent the optimal operation of the network. Therefore, there is a need to provide improved configuration of a network that utilizes the features and capabilities of newly added network devices while continuing to support legacy network devices.

SUMMARY

According to aspects of the present disclosure there are provided novel solutions for establishing a BH connection between an access point device and a network device, for example, an extender access point device of, for example, a local area network (LAN), a wireless local area network (WLAN), or a personal area network (PAN), and establishing a FH connection to one or more network devices, for example, an extender access point device and/or a client device so as to provide an optimal network configuration for a network. The aspects of the present disclosure provide features that enhance connectivity between access point devices and one or more network devices, for example, an extender access point device (such as a wireless extender access point devices (Wi-Fi access points)), a client device, a home/residential network access point devices, a Home Network Controller device, a wireless router, mesh networking nodes (e.g., Wi-Fi EasyMesh systems), and the like, or any combination thereof. A network is improved by delegating a controller to dictate radio association based on a network device history and network device based BH selection providing, for example, optimal connections to the BH network and client association orchestration on FH to aim for better QoE with cost effectiveness so as to accommodate new network devices as well as legacy network devices.

An aspect of the present disclosure provides a network device controller for configuration of an access point device in a network. The network device controller comprises a memory storing one or more computer-readable instructions and a processor configured to execute the one or more computer-readable instructions stored on the memory to cause the network device controller to receive one or more network parameters associated with one or more client devices within the network, configure the access point device to use a first frequency band of the access point device for a backhaul connection and a second frequency band of the access point device for a fronthaul connection, wherein the configuring is based on the one or more network parameters, and wherein the first frequency band is a 6 Gigahertz (GHz) band or higher frequency band and the second frequency band is a lower frequency band than the 6 GHz band, update the one or more network parameters, and selectively configure the access point device to switch the fronthaul connection from using the second frequency band to using a frequency band higher than the second frequency band based on the update of the one or more network parameters.

In an aspect of the present disclosure, the one or more network parameters are received as part of an association request from at least one of the one or more client devices.

In an aspect of the present disclosure, the one or more network parameters comprise a steer count, a data consumption rate, or both associated with any one or more of the one or more client devices.

In an aspect of the present disclosure, the processor is further configured to execute the one or more computer-readable instructions to cause the network device controller to at least one of configure the access point device to acknowledge an association request by a client device of the one or more client devices based on a frequency band indicated by the network device controller and configure the access point device to band steer an association request by a client device of the one or more client devices based on a frequency band indicated by the network device controller.

In an aspect of the present disclosure, the first frequency band is a 6 GHz band and the second frequency band is a 5 GHz band.

In an aspect of the present disclosure, the fronthaul connection comprises a first fronthaul connection associated with a first one or more client devices of the one or more client devices and a second fronthaul connection associated with a second one or more client devices of the one or more client devices, the first fronthaul connection uses the second frequency band, and the second fronthaul connection uses the first frequency band.

In an aspect of the present disclosure, the processor is further configured to execute the one or more computer-readable instructions to cause the network device controller to compare at least one of the one or more network parameters to a threshold, wherein the threshold comprises a roaming threshold, a throughput threshold or both, and configure the access point device to force at least one of the one or more client devices to use a lowest frequency band of the access point device for the fronthaul connection based on the comparing the at least one of the one or more network parameters to a threshold.

An aspect of the present disclosure provides a method for configuring an access point device in a network. The method comprises receiving one or more network parameters associated with one or more client devices within the network, configuring the access point device to use a first frequency band of the access point device for a backhaul connection and a second frequency band of the access point device for a fronthaul connection, wherein the configuring is based on the one or more network parameters, and wherein the first frequency band is a 6 Gigahertz (GHz) band or higher frequency band and the second frequency band is a lower frequency band than the 6 GHz band, updating the one or more network parameters, and selectively configuring the access point device to switch the fronthaul connection from using the second frequency band to using a frequency band higher than the second frequency band based on the update of the one or more network parameters.

In an aspect of the present disclosure, the method is such that the one or more network parameters are received as part of an association request from at least one of the one or more client devices.

In an aspect of the present disclosure, the method is such that the one or more network parameters comprise a steer count, a data consumption rate, or both associated with any one or more of the one or more client devices.

In an aspect of the present disclosure, the method further comprises configuring the access point device to acknowledge an association request by a client device of the one or more client devices based on a frequency band indicated by the network device controller and configuring the access point device to band steer an association request by a client device of the one or more client devices based on a frequency band indicated by the network device controller.

In an aspect of the present disclosure, the method is such that the first frequency band is a 6 GHz band and the second frequency band is a 5 GHz band.

In an aspect of the present disclosure, the method is such that the fronthaul connection comprises a first fronthaul connection associated with a first one or more client devices of the one or more client devices and a second fronthaul connection associated with a second one or more client devices of the one or more client devices, the first fronthaul connection uses the second frequency band, and the second fronthaul connection uses the first frequency band.

In an aspect of the present disclosure, the method further comprises comparing at least one of the one or more network parameters to a threshold, wherein the threshold comprises a roaming threshold, a throughput threshold or both, and configuring the access point device to force at least one of the one or more client devices to use a lowest frequency band of the access point device for the fronthaul connection based on the comparing the at least one of the one or more network parameters to a threshold.

An aspect of the present disclosure provides a non-transitory computer readable medium for controlling access to one or more network resources. The program when executed by a processor of the network device, causes the network device to perform one or more operations including the steps of the methods described above.

The above-described electronic apparatus(es) and/or network devices may be implemented as any of a residential network access point device, an electronic device (for example, a mobile phone, a computing device such as a notebook computer, or both) according to some example embodiments.

Thus, according to various aspects of the present disclosure described herein, it is possible to determine that a BH connection between a access point device and an extender access point device should be established using an initial or default frequency band while the FH connection between the access point device and other network devices should be established using a different or higher frequency band. The novel solution described herein addresses the problem of a network having and/or adding legacy network devices and/or new network devices without consideration of present network capabilities and/or features such as the ability to select a frequency band, such as the 6 Gigahertz (GHz) band or higher frequency band for BH and/or FH, and to dynamically modify the selected frequency band based on one or more network parameters. Such a novel solution will significantly enhance the installation and configuration of a network, such as a home/residential network, that includes access point devices, wireless access point devices (Wi-Fi APs), HNC devices, wireless routers, mesh networking nodes (for example, Wi-Fi mesh systems, such as EasyMesh), any other network devices, or a combination thereof. In particular, the novel solution provides improvements for BH association and FH association so as to provide an optimal network environment configuration.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

With the advance of 6 GHz band capability and higher frequency band capability, there will be new access point devices and network devices coming into the network and this poses certain challenges as there would be legacy Wi-Fi network devices as well as access point devices with improved network capabilities. A need exists for mechanisms to form an optimal network configuration which is not only cost effective but adapts itself to cater to network device diversity and usage rather than just throughput all the time. By orchestrating BH selection (for example, for a mesh topology) and FH topologies by network device capability and certain learning, the QoE with cost effectiveness can be improved for legacy network devices, for example, legacy network devices that conform to the IEEE 802.11 a/b/g/n/ac standard and up to IEEE 802.11 ax standard compliant network devices. For example, not all network devices in a network may support higher frequency band selection for FH connection. But, by configuring the access point device to dynamically switch the BH, FH or both connections to a particular frequency band, a network can be optimized even when one or more network devices of the network do not support higher frequency bands, such as the 6 GHz band or higher.

Figure 1:
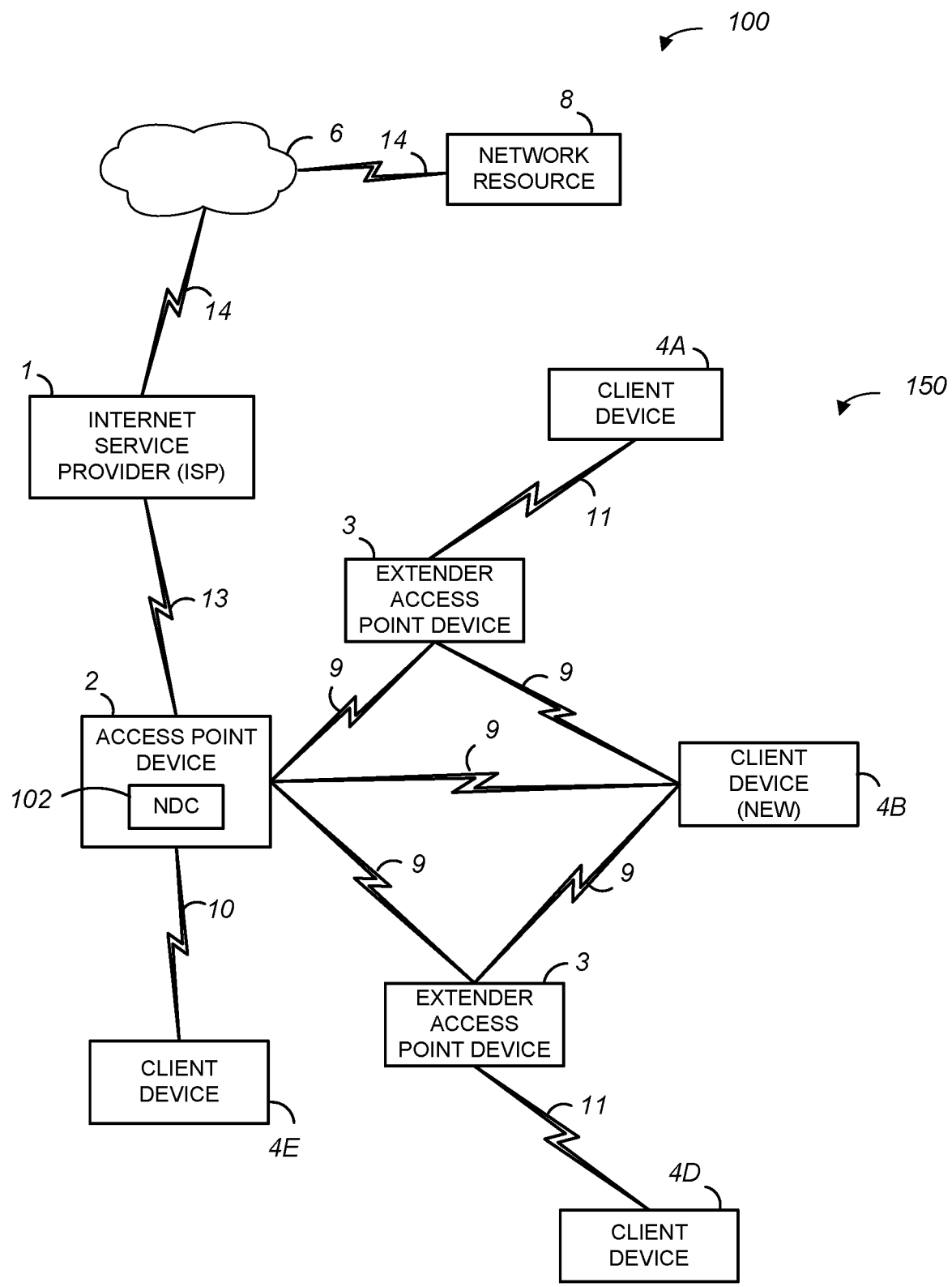
FIG. 1 is a schematic diagram of a network environment, according to one or more aspects of the present disclosure.

FIG. 1 is a schematic diagram of a system, according to one or more example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the network environment 100 include a network resource 8 connected to Internet 6 and an access point device 2 connected to the Internet 6 via an Internet Service Provider (ISP) 1 and also connected to different network devices such as wireless extender access point devices 3 and client devices 4A-4D, collectively referred to as client device(s) 4. The network 150 shown in FIG. 1 includes network devices (for example, extender access point devices 3 and client devices 4) that may be connected in one or more wireless networks (for example, private, guest, iControl, backhaul network, or Internet of things (IoT) network) within the network 150. Additionally, there could be some overlap between network devices (for example, extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 of network environment 100 can be, for example, a streaming video provider or any computer for connecting the access point device 2 to the Internet 6. The network resource 8 can be any type of network device and/or network repository. The connection 14 between the Internet 6 and the ISP 1 and between the Internet 6 and network resource 8 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (for example, FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example The access point device 2 can be, for example, an access point and/or a hardware electronic device that may be a combination modem and gateway that combines the functions of a modem, an access point (AP), and/or a router for providing content received from the ISP 1 to network devices (for example, wireless extender access point devices 3 and client devices 4) in the network 150. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). The access point device 2 can include a controller 102, such as a network device controller (NDC). The controller 102 can select a frequency band for a FH connection, a BH connection, or both, for example, based on one or more network parameters associated with any one or more network devices. In one or more embodiments, the controller 102 is remote from the access point device 2, the network 150 or both, for example, the controller 102 can be located at a network resource 8 and communicate with the access point device 2 via Internet 6 and ISP 1.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz band, 5 GHz band, 6 GHz band or 60 GHz band. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels of a frequency band that are available for use.

The extender access point devices 3 can be, for example, wireless hardware electronic devices such as access points, extenders, repeaters, etc. used to extend the wireless network by receiving the signals transmitted by the access point device 2 and rebroadcasting the signals to, for example, client devices 4, which may out of range of the access point device 2. The extender access point devices 3 can also receive signals from the client devices 4 and rebroadcast the signals to the access point device 2, or other client devices 4.

The connection 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz band, 5 GHz band, 6 GHz band or 60 GHz band. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels 11A that are available for use.

The client devices 4 can be any type of network device that connects to an access point device 2, an extender access point device 3, or both, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. A client device 4A can be a legacy network device that does not include capabilities above, for example, the 5 GHz band, while newly added client device 4B can include capabilities of a higher frequency band, for example, the 6 GHz band or high frequency band.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, or 6G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz band, 5 GHz band, 6 GHz band or 60 GHz band. One or more of the connections 10 can also be a wired Ethernet connection.

Figure 2:
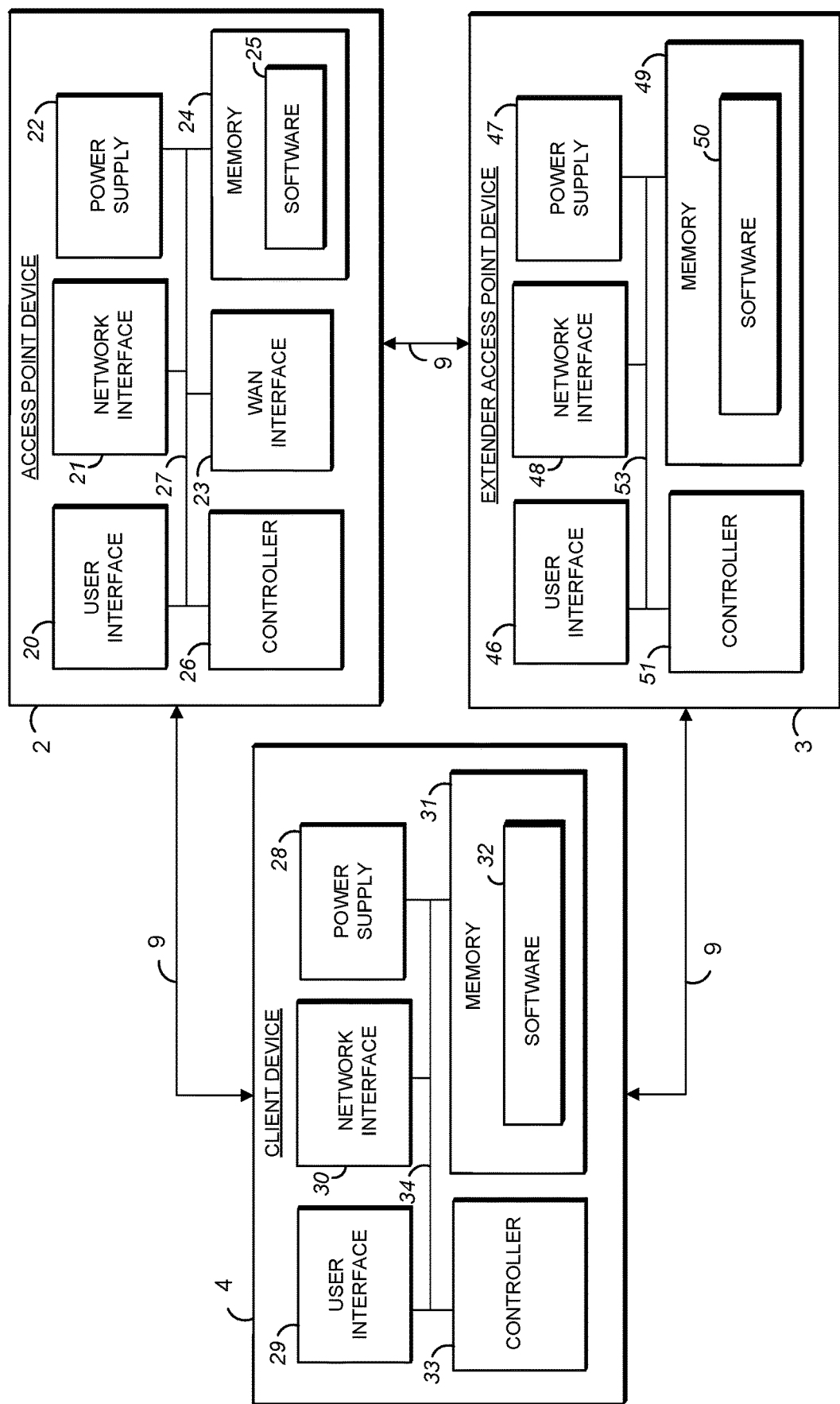
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network 150 and/or network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the network 150 and/or network environment 100.

FIG. 2 is a more detailed block diagram illustrating various components of an exemplary access point device, client device, and wireless extender implemented in the network 150 of FIG. 1, according to some example embodiments.

Although FIG. 2 only shows one extender access point device 3 and one client device 4, the extender access point device 3 and the client device 4 shown in the figure are meant to be representative of the other extender access point devices 3 and client devices 4 of a network system, for example, system 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2, the client device 4 can be, for example, a computer, a portable device, an electronic tablet, an e-reader, a PDA, a mobile phone such as a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a power supply 28, a user interface 29, a network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (for example, either directly or by way of another network device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the access point device 2 and the extender access point device 3 using the communication protocols in accordance with connection 9 (for example, as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is an electronic device, such as a mobile phone, and software 32 includes one or more instructions for establishing a FH connection with the access point device 2.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (for example, 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the extender access point device 3. The power supply 47 supplies power to the internal components of the wireless extender access point device 3 through the internal bus 53. The power supply 47 can be connected to an electrical outlet (for example, either directly or indirectly by way of another device) via a cable or wire.

The network interface 48 can include various network cards, interfaces, and circuitry implemented in software and/or hardware to enable communications with the client device 4 and the access point device 2 using the communication protocols in accordance with connection 9 (for example, as described with reference to FIG. 1). For example, the network interface 48 can include multiple radios or sets of radios (for example, a 2.4 GHz radio, one or more 5 GHz radios, and/or a 6 GHz radio), which may also be referred to as wireless local area network (WLAN) interfaces. One radio or set of radios (for example, 5 GHz and/or 6 GHz radio(s)) provides a BH connection between the wireless extender access point device 3 and the access point device 2, and optionally other wireless extender access point device(s) 3. Another radio or set of radios (for example, 2.4 GHz, 5 GHz, and/or 6 GHz radio(s)) provides a fronthaul (FH) connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (for example, 46-49 and 51) of the extender access point device 3 may be established using the internal bus 53.

The access point device 2 can be, for example, a hardware electronic device that can combine one or more functions of any of a modem, a gateway, an access point (AP), a router, or combinations thereof for providing content received from the content provider (ISP) 1 to network or wireless devices (for example, extender access point devices 3, client devices 4) in the network 150. It is also contemplated by the present disclosure that the access point device 2 can include the function of, but is not limited to, an IP/QAM STB or SMD that is capable of decoding audio/video content, and playing OTT or MSO provided content. As shown in FIG. 2, the access point device 2 includes a user interface 20, a network interface 21, a power supply 22, a wide area network (WAN) interface 23, a memory 24, and a controller 26. The user interface 20 can include, but is not limited to, push buttons, a keyboard, a keypad, an LCD, a TFT, an LED, an HD or other similar display device including a display device having touch screen capabilities so as to allow interaction between a user and the access point device 2.

The network interface 21 may include various network cards, and circuitry implemented in software and/or hardware to enable communications with the extender access point device 3 and the client device 4 using the communication protocols in accordance with connection 9 (for example, as described with reference to FIG. 1). Additionally, the various network cards, interfaces, and circuitry of the network interface 21 enable communications with a client device 4 (for example, a mobile device) using the one or more communication protocols in accordance with connection 10 (for example, as described with reference to FIG. 1). For example, the network interface 21 can include an Ethernet port (also referred to as a LAN interface) and multiple radios or sets of radios (for example, a 2.4 GHz radio, one or more 5 GHz radios, a 6 GHz radio, and/or any other radio also referred to as WLAN interfaces). One radio (and/or set of radios) (for example, 5 GHz and/or 6 GHz radio(s)) provides a BH connection between the access point device 2 and the wireless extender access point device(s) 3. Another radio (and/or set of radios) (for example, 2.4 GHz, 5 GHz, 6 GHz, and/or other radio(s)) provides a FH connection between the access point device 2 and one or more client device(s) 4.

The power supply 22 supplies power to the internal components of the access point device 2 through the internal bus 27. The power supply 22 can be connected to an electrical outlet (e.g., either directly or by way of another device) via a cable or wire. The wide area network (WAN) interface 23 may include various network cards, and circuitry implemented in software and/or hardware to enable communications between the access point device 2 and the ISP 1 using the wired and/or wireless protocols in accordance with connection 13 (for example, as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and performing configuration and communication functions related to one or more network devices (network resource 8, wireless extender access point devices 3 and client devices 4) in the network in accordance with the embodiments described in the present disclosure (for example, including a dynamic configuration of a BH and/or FH connection, according to one or more example embodiments of the present disclosure).

The controller 26 controls the general operations of the access point device 2 as well as performs configuration and connection functions related to one or more network devices (network resource 8, wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of computer-readable instructions, algorithms, or software including the software 25 for controlling the operation and functions of the access point device 2 in accordance with the embodiments described in the present disclosure. Communication between the components (for example, 20-24, and 26) of the access point device 2 may be established using the internal bus 27. The controller 26 may also be referred to as a processor, generally. In one or more embodiments, the controller 26 can be a NDC 102 as discussed with reference to FIG. 1.

Figure 3:
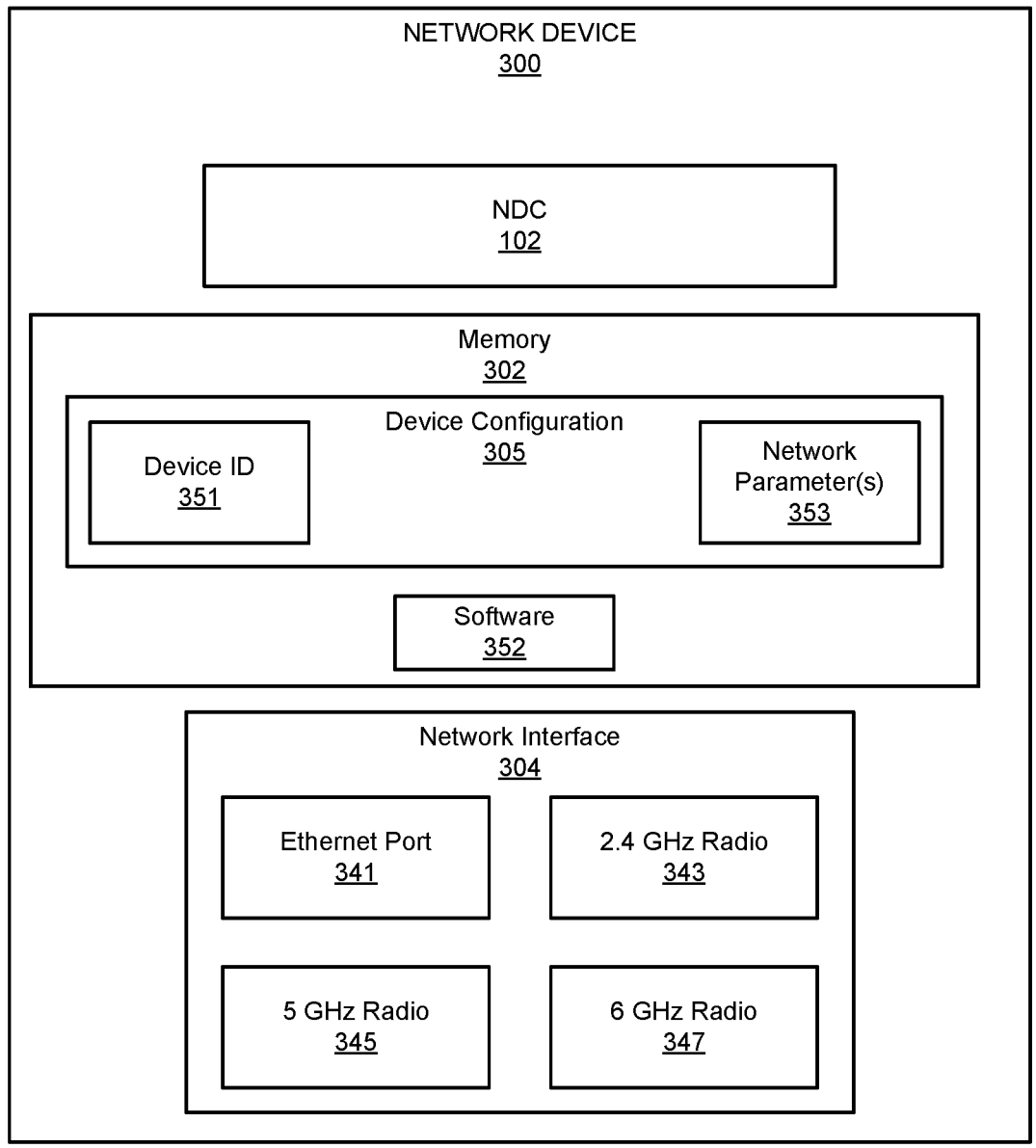
FIG. 3 is a more detailed block diagram illustrating certain components of an exemplary network device implemented in of FIGS. 1-2, according to one or more aspects of the present disclosure.

FIG. 3 is a more detailed block diagram illustrating certain components of an exemplary network device 300, for example, an access point device 2, an extender access point device 3, a client device 4, a network resource 8, or any combination thereof implemented in the system of FIGS. 1 and 2, according to some example embodiments.

As shown in FIG. 3, the network device 300 includes the network interface 304, for example, similar to or the same as network interface 21, the memory 302, for example, similar to or the same as network memory 24, and the controller (processor) 102, for example, similar to or the same as controller 26.

The network interface 304 includes an Ethernet port 341 (for example, a wired LAN interface), a 2.4 GHz radio 343 (associated with a 2.4 GHz band), a 5 GHz radio 345 (associated with a 5 GHz band), a 6 GHz radio 347 (associated with a 6 GHz band), and/or any other radio associated with any other frequency band (for example, wireless LAN interfaces, or WLAN interfaces). The network device 300 may communicate with the local area network devices (for example, the extender access point devices 3, the client devices 4) of a system, for example, network 150 of FIG. 1, via one or more of the Ethernet port 341, and/or one or more radios. However, some other example embodiments of inventive concepts of the present disclosure are not limited to these interfaces only (for example, the techniques may be applied with a 6 GHz radio, higher frequency band radio and/or other similar future developed technologies). As mentioned above, according to aspects of the present disclosure, one radio or set of radios can operate as a BH radio to provide a BH connection between the access point device 2 and the wireless extender access point device(s) 3, while another radio or set of radios can provide a FH connection between the access point device 2 and one or more network devices, such as one or more the client devices 4.

The memory 302 stores one or more computer-readable instructions, for example, a software or application 352 and a device configuration 305. A device configuration 305 can store one or more network parameters 353 associated with a device identifier (ID) 351. The one or more network parameters 353 can comprise any of a frequency band capability or radio support of the network device 300. The device ID 351 can comprise a unique identifier for a network device 300. For example, a client device 4B can join a network 150 and client device 4B can be associated with a device ID 351. The device configuration 305 can store the device ID 351 and associate the type of radio or connection as a device parameter 353 with the device ID 351.

The controller 102 can be a network device controller that includes a processor that is configured to access the memory 302. If the network device 300 is an access point device and/or a network resource 8, the controller 102 can determine a frequency band for a BH connection, a frequency band for a FH connection, or both (for example, via execution of software, such as software 25). The processor of the controller 102 also controls communications with the network or wireless devices (for example, the wireless extender access point devices 3, the client devices 4) via the Ethernet port 103, the 2.4 GHz radio 343, the 5 GHz radio 345, the 6 GHz radio 347, and/or any combination thereof in accordance with embodiments described in the present disclosure. The controller 102 can determine which radio or frequency band should be used for the BH connection, the FH connection and/or both based on one or more network parameters 353. The one or more network parameters 353 can comprise any of a bandwidth, a throughput, a steer count, a data consumption rate, roaming, any other network parameter, or any combination thereof.

Figure 4:
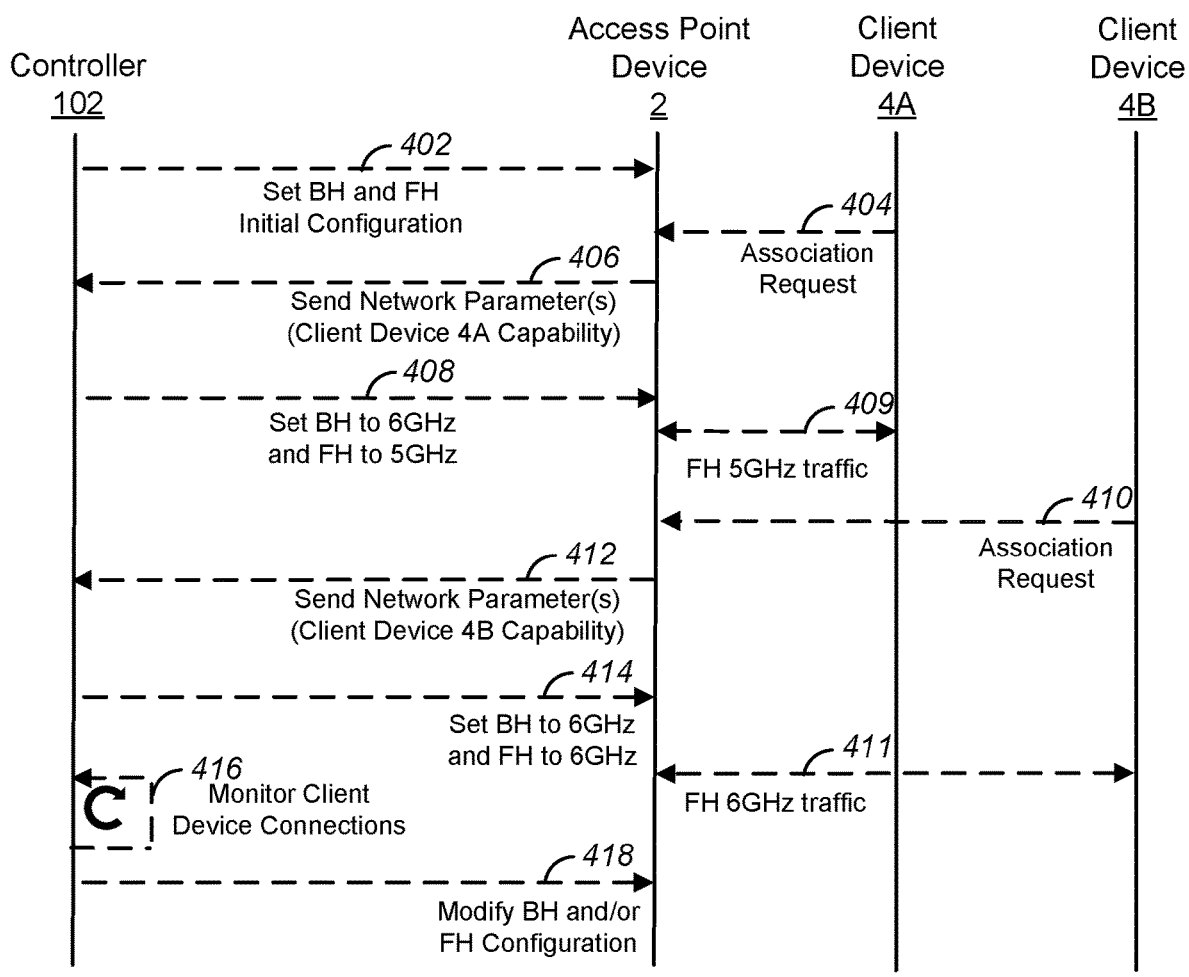
FIG. 4 is a flow diagram illustrating a network device controller configuring an access point device to utilize a FH frequency band and a BH frequency band, according to one or more aspects of the present disclosure.

FIG. 4 is a flow diagram illustrating a network device 300 controller configuring an access point device 2 to utilize a FH frequency band (a FH radio) and a BH frequency band (a BH radio), according to one or more embodiments.

The access point device 2 may be programmed with one or more instructions (for example, one or more computer-readable instructions) to perform the configuration of the access point device 2 according to one or more embodiments, or may use its native software in some other example embodiments. In FIG. 4, it is assumed that the devices include their respective controllers and their respective software stored in their respective memories, as discussed above in connection with FIGS. 1-3, which when executed by their respective controllers perform the functions and operations in accordance with the example embodiments of the present disclosure (for example, including selecting a radio for a FH connection and/or a radio for a BH connection).

A network device, such as access point device 2 and/or network resource 8, comprises a controller 102 that executes one or more computer-readable instructions, stored on a memory 302, that when executed perform one or more of the operations. In one or more embodiments, the one or more instructions can be one or more software applications, for example, one or more software 25. While the operations are presented in a certain order, the present disclosure contemplates that any one or more operations can be performed simultaneously, substantially simultaneously, repeatedly, in any order or not at all (omitted). While FIG. 4 illustrates a network device controller 102 remote from an access point device 2, the present disclosure contemplates the controller 102 within or part of access point device 2.

The controller 102 can send a command 402 to set the BH connection and the FH connection as part of an initial configuration of the access point device 2. For example, the BH connection can be associated with a 5 GHz radio or band. The access point device 2 can be configured to utilize the 5 GHz band for the BH connection and the 2.4 GHz band for the FH connection. A client device 4A can send an association request 404 to the access point device 2. The association request 404 can include one or more network parameters 353 associated with the client device 4A, for example, the one or more network parameters 353 can be indicative of one or more network capabilities of client device 4A such as one or more supported frequency bands. The access point device 2 can send 406 one or more network parameters 353 to the controller 102. The controller 102 can determine an optimal configuration for the network associated with access point device 2 based on the one or more network parameters 353 received from the access point device 2, one or more previously stored and/or received network parameters 353 or both. The controller 102 can send a command 408 to the access point device 2 that configures the access point device 2 to switch the BH connection to utilize the 6 GHz band while the FH connection is switched to utilize the 5 GHz band such that traffic 409 to and/from the client device 4A is communicated over the 5 GHz FH connection.

The access point device 2 can receive an association request 410 from a new client device 4B. The association request 410 can include one or more network parameters 353 associated with the client device 4B, for example, the one or more network parameters 353 can be indicative of one or more network capabilities of client device 4B. The access point device 2 can send 412 one or more network parameters 353 to the controller 102. The controller 102 can determine an optimal configuration for the network, such as network 150, associated with access point device 2 based on the one or more network parameters 353 received from the access point device 2, one or more previously stored and/or received network parameters 353 or both. The controller 102 can send a command 414 to the access point device 2 that configures the access point device 2 to maintain the BH connection to utilize the 6 GHz band while the FH connection is switched to utilize the 6 GHz band such that traffic 411 to and/from the client device 4B is communicated over the 6 GHz FH connection.

The controller 102 can monitor client device connections 416 continuously, periodically, at timed intervals, based on one or more criteria, any other basis, or any combination thereof. For example, the controller 102 can send a modification command 418 to modify the BH connection, the FH connection or both associated with the access point device 2 based on the monitoring. For example, the monitoring can indicate that the client devices 4 are legacy network devices such that the controller 102 configures the access point device 2 to utilize the 6 GHz band as the BH connection and any other band as the FH connection. Configuring the access point device 2 can comprise switching a BH connection, a FH connection or both, maintaining a BH connection, a FH connection or both, or any combination thereof.

While association requests 404 and 410 are discussed as being initiated by a client devices 4A and 4B, respectively, the present disclosure contemplates that the access point device 2 can request or otherwise obtain the one or more network parameters 353 associated with a client device 4 when the client device 4 comes within range of the access point device 2 or is otherwise probed. In one or more embodiments, the one or more network parameters 353 can be sent from the client device 4 to the access point device 2 and/or controller 120 periodically or at any timed interval.

Figure 5:
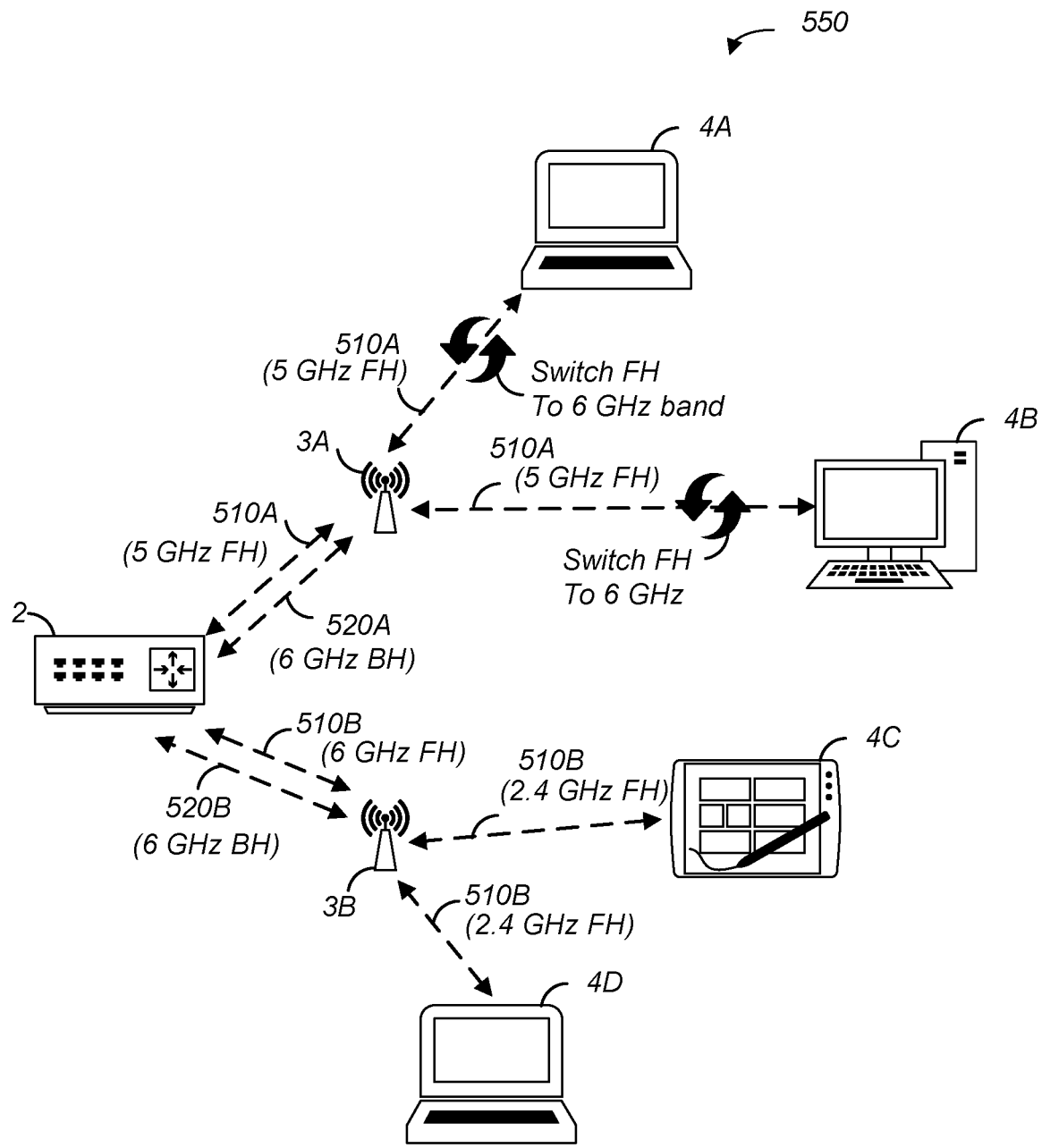
FIG. 5 is a block diagram of BH and FH connections between an access point device and a plurality of extender access point devices of a network, according to one or more aspects of the present disclosure.

FIG. 5 is a block diagram of BH and FH connections between an access point device 2 and a plurality of extender access point devices 3 of a network 550, according to one or more aspects of the present disclosure. The network 550 can be the same as or similar to network 150 of FIG. 1. The access point device 2 can be configured, for example, by a controller 102 located within access point device 2 or remote from the access point device 2 (such as at or within a network resource 8). The access point device 2 can establish a 6 GHz BH connection 520 to extender access point devices 3A and 3B. The access point device 2 can receive one or more network parameters 353 from client devices 4A, 4B, 4C and 4D, for example, via the one or more extender access point devices 3A and 3B. The controller 102 can receive the one or more network parameters 353 and determine, based on the one or more network parameters 353, the frequency band to use for the BH connection and the frequency band to use for the FH connections to any one or more client devices 4. For example, the one or more network parameters 353 can indicate that client devices 4A and 4B support up to a 6 GHz band for a FH connection while client devices 4C and 4D support up to a 5 GHz band for a FH connection. Initially, the controller 102 can configure the access point device 2 to establish a 5 GHz FH connection 510A for client devices 4A and 4B and a 2.4 GHz FH connection 510B for client devices 4C and 4D. The one or more network parameters 353 can be updated, for example, to indicate that client devices 4A and 4B require that data be transmitted at a faster speed. The controller 102 can configure the access point device 2 to switch the FH connection 510A from using 5 GHz band to the 6 GHz band and to maintain the FH connection 510B using the 2.4 GHz band. The network performance for the client devices 4A and 4B is improved by allowing traffic associated with client devices 4A and 4B to routed over a 6 GHz FH connection.

Figure 6:
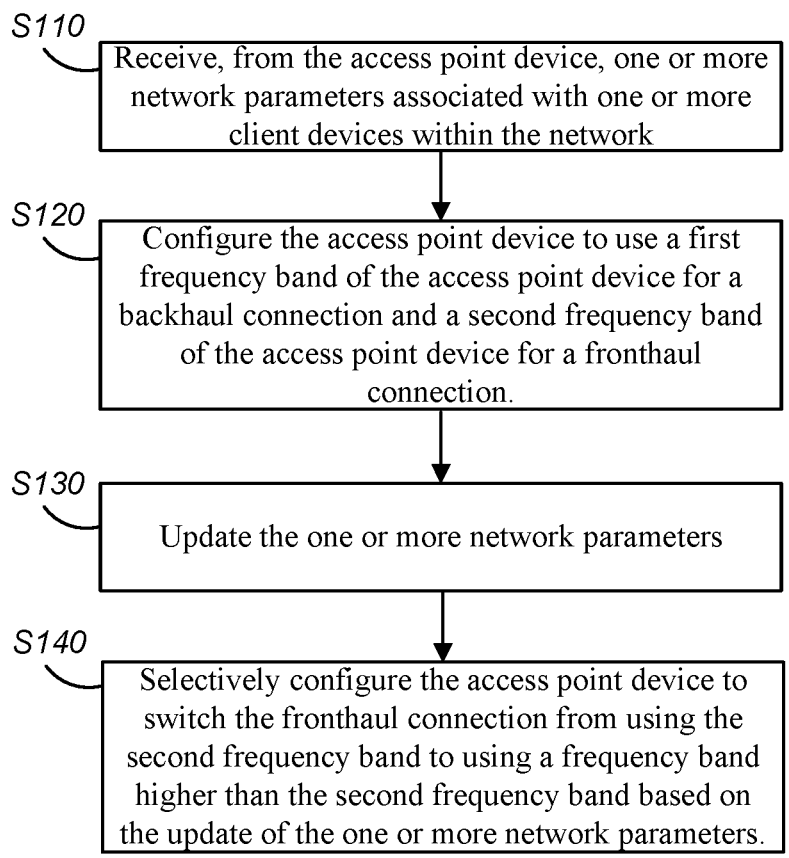
FIG. 6 is a flow chart illustrating a method for configuration of access point device in a network, according to one or more aspects of the present disclosure.

FIG. 6 is a flow chart illustrating a method for dynamic channel selection, according to one or more aspects of the present disclosure.

In one or more embodiments, a network device may include a controller 102, such as a network device controller, that may be programmed with or to execute one or more instructions (for example, software or application 32) to perform steps for configuring an access point device 2 in a network, such as network 150, to initiate and establish a BH connection between the access point device 2 and an expander device 3 and a FH connection between the access point device 2 and one or more network devices, such as one or more client devices 4. In FIG. 6, it is assumed that the network devices include their respective controllers and their respective software stored in their respective memories, as discussed above in reference to FIGS. 2-5, which when executed by their respective controllers perform the functions and operations in accordance with the example embodiments of the present disclosure (for example, including dynamic and/or selective configuration of an access point device 2).

The controller 102 executes one or more computer-readable instructions, stored in a memory, for example, a memory 24 or a memory 302 of an access point device 2 or a network resource 8, respectively, that when executed perform one or more of the operations of steps S110-S140. In one or more embodiments, the one or more instructions may be one or more software applications, for example, a software 25 or a software 352 of an access point device 2 or a network resource 8, respectively. While the steps S110-S140 are presented in a certain order, the present disclosure contemplates that any one or more steps can be performed simultaneously, substantially simultaneously, repeatedly, in any order or not at all (omitted).

At step S110, the network device controller 102 receives, from the access point device 2, one or more network parameters 353 associated with one or more client devices 4 within a network, such as a network 150 of FIG. 1. The one or more network parameters 353 can be received periodically, automatically, in response to a probe or request, or based on any other time interval or basis. The one or more network parameters 353 can be received as part of any of an association request from at least one of the one or more client devices 4, when the one or more client devices 4 can within range of the access point device 2, any other basis, or any combination thereof. The one or more network parameters 353 can indicate the network capability or frequency band and/or radio support of the associated client device 4. For example, the one or more network parameters 353 can comprise a steer count, a data consumption rate, or both associated with any one or more of the one or more client devices 4.

At step S120, the network device controller 102 configures the access point device 2 to use a first frequency band of the access point device for a backhaul connection and a second frequency band of the access point device for a fronthaul connection. The configuration in step S120 can be based on the one or more network parameters 353. For example, the first frequency band is a 6 GHz band or higher frequency band and the second frequency band is a lower frequency band than the 6 GHz band, such as a 5 GHz band. In one or more embodiments, the configuration is based on a comparison of the one or more network parameters 353 to one or more thresholds. The one or more thresholds can comprise any of a roaming threshold, a throughput threshold, any other threshold, or any combination thereof. The frequency band associated with the BH connection or the FH connection can be based on the comparison. For example, the network controller device 102 can configure the access point device to force at least one of the one or more client devices to use a lowest frequency band of the access point device for the fronthaul connection based on the comparing the at least one of the one or more network parameters to a threshold.

At step S130, the network controller device 102 updates the one or more network parameters 353. For example, a network device can be added to the network 150, traffic on a frequency band can be increased or decreased, an application or network device can require additional bandwidth, increased throughput and/or an increased data rate such that the one or more network parameters 353 are updated to reflect the current network conditions.

At step S140, the network device controller 102 can selectively configure the access point device 2 to switch the FH connection from using the second frequency band to using a first frequency band higher than the second frequency band based on the update of the one or more network parameters 353. In this way, the network device controller 102 can dynamically configure the network to improve QoE based on current network conditions, such as one or more network parameters 353. In one or more embodiments, the FH connection comprises a first FH connection associated with a first one or more client devices 4 of the one or more client devices 4 and a second FH connection associated with a second one or more client devices 4 of the one or more client devices 4. The first FH connection can use the second frequency band while the second FH connection can use the first frequency band.

In one or more embodiments, the configuration of steps S120 and/or S140 can comprise configuring the access point device 2 to acknowledge an association request by a client device 4 of the one or more client devices 4 based on a frequency band indicated by the network device controller 102. For example, the network device controller 102 can direct that the access point device 2 only honor associations with the one or more client devices 4 that support the 6 GHz band or higher frequency band. In one or more embodiments, less steer count and high throughput consumption one or more client devices 4 can be made to utilize only the 6 GHz band for the FH connection while highly roaming, high steer count one or more client devices 4 are forced to be associated to the 2.4 GHz band.

According to one or more example embodiments of inventive concepts disclosed herein, there are provided novel solutions for establishing a BH connection between an access point device and an extender access point device and a FH connection to one or more client devices selectively and/or dynamically where the frequency band for the connections is based on one or more network parameters associated with the one or more client devices. The novel solutions according to example embodiments of inventive concepts disclosed herein provide features that enhance, for example, configuration of home/residential network gateway (GW) devices, wireless access points (Wi-Fi APs), Home Network Controller (HNC) devices, wireless routers, mesh networking nodes (e.g., Wi-Fi EasyMesh systems), and the like. Improvements can be realized by utilizing through dynamic selection the frequency band for the FH and BH connections to optimize network performance.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What I claim is:

1. A network device controller for configuration of an access point device in a network, the network device controller comprising:
    a memory storing one or more computer-readable instructions;
    a processor configured to execute the one or more computer-readable instructions stored on the memory to cause the network device controller to:
        receive, from a device configuration, one or more network parameters associated with one or more client devices within the network, wherein the one or more network parameters are indicative of one or more network capabilities of the client device;
        configure the access point device to use a first frequency band of the access point device for a backhaul connection and a second frequency band of the access point device for a fronthaul connection, wherein the configuring is based on the one or more network parameters, and wherein the first frequency band is a 6 Gigahertz (GHz) band or higher frequency band and the second frequency band is a lower frequency band than the 6 GHz band;
        update the one or more network parameters of the device configuration; and
        selectively configure the access point device to switch the fronthaul connection from using the second frequency band to using a frequency band higher than the second frequency band based on the update of the one or more network parameters.

2. The network device controller of claim 1, wherein the one or more network parameters are received as part of an association request from at least one of the one or more client devices.

3. The network device controller of claim 1, wherein the one or more network parameters comprise a steer count, a data consumption rate, or both associated with any one or more of the one or more client devices.

4. The network device controller of claim 1, wherein the processor is further configured to execute the one or more computer-readable instructions to cause the network device controller to at least one of:
    configure the access point device to acknowledge an association request by a client device of the one or more client devices based on a frequency band indicated by the network device controller; and
    configure the access point device to band steer an association request by a client device of the one or more client devices based on a frequency band indicated by the network device controller.

5. The network device controller of claim 1, wherein the first frequency band is a 6 GHz band and the second frequency band is a 5 GHz band.

6. The network device controller of claim 5, wherein:
    the fronthaul connection comprises a first fronthaul connection associated with a first one or more client devices of the one or more client devices and a second fronthaul connection associated with a second one or more client devices of the one or more client devices;

the first fronthaul connection uses the second frequency band; and the second fronthaul connection uses the first frequency band.

7. The network device controller of claim 1, wherein the processor is further configured to execute the one or more computer-readable instructions to cause the network device controller to:

compare at least one of the one or more network parameters to a threshold, wherein the threshold comprises a roaming threshold, a throughput threshold or both; and configure the access point device to force at least one of the one or more client devices to use a lowest frequency band of the access point device for the fronthaul connection based on the comparing the at least one of the one or more network parameters to a threshold.

8. A method for configuring an access point device in a network, the method comprising:

receiving, from a device configuration, one or more network parameters associated with one or more client devices within the network, wherein the one or more network parameters are indicative of one or more network capabilities of the client device;

configuring the access point device to use a first frequency band of the access point device for a backhaul connection and a second frequency band of the access point device for a fronthaul connection, wherein the configuring is based on the one or more network parameters, and wherein the first frequency band is a 6 Gigahertz (GHz) band or higher frequency band and the second frequency band is a lower frequency band than the 6 GHz band;

updating the one or more network parameters of the device configuration; and selectively configuring the access point device to switch the fronthaul connection from using the second frequency band to using a frequency band higher than the second frequency band based on the update of the one or more network parameters.

9. The method of claim 8, wherein the one or more network parameters are received as part of an association request from at least one of the one or more client devices.

10. The method of claim 8, wherein the one or more network parameters comprise a steer count, a data consumption rate, or both associated with any one or more of the one or more client devices.

11. The method of claim 8, further comprising:

configuring the access point device to acknowledge an association request by a client device of the one or more client devices based on a frequency band indicated by the network device controller; and configuring the access point device to band steer an association request by a client device of the one or more client devices based on a frequency band indicated by the network device controller.

12. The method of claim 8, wherein the first frequency band is a 6 GHz band and the second frequency band is a 5 GHz band.

13. The method of claim 12, wherein:

the fronthaul connection comprises a first fronthaul connection associated with a first one or more client devices of the one or more client devices and a second fronthaul connection associated with a second one or more client devices of the one or more client devices;

the first fronthaul connection uses the second frequency band; and the second fronthaul connection uses the first frequency band.

14. The method of claim 8, further comprising:

comparing at least one of the one or more network parameters to a threshold, wherein the threshold comprises a roaming threshold, a throughput threshold or both; and configuring the access point device to force at least one of the one or more client devices to use a lowest frequency band of the access point device for the fronthaul connection based on the comparing the at least one of the one or more network parameters to a threshold.

15. A non-transitory, computer-readable medium storing one or more computer-readable instructions for controlling access to one or more network resources that when executed by a processor, cause the processor to:

receive, from a device configuration, one or more network parameters associated with one or more client devices within the network, wherein the one or more network parameters are indicative of one or more network capabilities of the client device;

configure the access point device to use a first frequency band of the access point device for a backhaul connection and a second frequency band of the access point device for a fronthaul connection, wherein the configuring is based on the one or more network parameters, and wherein the first frequency band is a 6 Gigahertz (GHz) band or higher frequency band and the second frequency band is a lower frequency band than the 6 GHz band;

update the one or more network parameters of the device configuration; and selectively configure the access point device to switch the fronthaul connection from using the second frequency band to using a frequency band higher than the second frequency band based on the update of the one or more network parameters.

16. The non-transitory, computer-readable medium of claim 15, wherein at least one of:

the one or more network parameters are received as part of an association request from at least one of the one or more client devices; and the one or more network parameters comprise a steer count, a data consumption rate, or both associated with any one or more of the one or more client devices.

17. The non-transitory, computer-readable medium of claim 15, wherein the one or more computer-readable instructions when executed by the processor, further cause the processor to:

configure the access point device to acknowledge an association request by a client device of the one or more client devices based on a frequency band indicated by the network device controller; and configure the access point device to band steer an association request by a client device of the one or more client devices based on a frequency band indicated by the network device controller.

18. The non-transitory, computer-readable medium of claim 15, wherein the first frequency band is a 6 GHz band and the second frequency band is a 5 GHz band.

19. The non-transitory, computer-readable medium of claim 18, wherein:

the fronthaul connection comprises a first fronthaul connection associated with a first one or more client devices of the one or more client devices and a second fronthaul connection associated with a second one or more client devices of the one or more client devices;

the first fronthaul connection uses the second frequency band; and the second fronthaul connection uses the first frequency band.

20. The non-transitory, computer-readable medium of claim 15, wherein the one or more computer-readable instructions when executed by the processor, further cause the processor to:

compare at least one of the one or more network parameters to a threshold, wherein the threshold comprises a roaming threshold, a throughput threshold or both; and configure the access point device to force at least one of the one or more client devices to use a lowest frequency band of the access point device for the fronthaul connection based on the comparing the at least one of the one or more network parameters to a threshold.

* * * * *